(12) United States Patent
Ohkita et al.

(10) Patent No.: US 6,233,112 B1
(45) Date of Patent: May 15, 2001

(54) MAGNETIC RECORDING/REGENERATING APPARATUS

(75) Inventors: Masao Ohkita; Mikio Oka; Katsunari Sonoda, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/243,647

(22) Filed: Feb. 3, 1999

(30) Foreign Application Priority Data

Feb. 5, 1998 (JP) .................................................. 10-024371

(51) Int. Cl.[7] .................................................. G11B 15/675
(52) U.S. Cl. .......................................................... 360/96.5
(58) Field of Search ................................... 360/96.5, 96.6

(56) References Cited

U.S. PATENT DOCUMENTS 5,377,061 * 12/1994 Yoshimura .......................... 360/96.5

* cited by examiner

*Primary Examiner*—Robert S. Tupper
(74) *Attorney, Agent, or Firm*—Brinks Hofer Gilson & Lione

(57) ABSTRACT

In the conventionl magnetic recording/regenerating apparatus, loading/unloading of a cartridge has been manually carried out, thus requiring a large force (about 1.5 to 3 kgf) for these operations by a spring force of a leaf spring, and making it difficult to ensure loading of the cartridge in the magnetic recording/regenerating apparatus. In the magnetic recording/regenerating apparatus of the invention, the portion between one end side and the other side of the linking member is rotatably supported on the bottom plate of the enclosure, and the supporting point as a fulcrum, the distance between the fulcrum and an end connecting the second sliding member is made smaller than the distance between the fulcrum and the other end connecting the first sliding member.

6 Claims, 14 Drawing Sheets

MAGNETIC RECORDING/REGENERATING APPARATUS

BACKGROUND OF THE INVENTION

1. Field of the Invention

The present invention relates to a magnetic recording/regenerating apparatus. More particularly, the present invention relates to a mounting mechanism for ensuring mounting of a cartridge for housing a magnetic tape.

2. Description of the Related Art

A conventional magnetic recording/regenerating apparatus will be described with reference to a plan view shown in FIG. 19, a sectional view of FIG. 19 cut along the line 20A—20A shown in FIG. 20A, and a partial side view of FIG. 20A shown in FIG. 20B.

In the conventional magnetic recording/regenerating apparatus 21 (hereinafter referred to as the "apparatus 21"), a pair of rail-shaped guiding members 21b and 21c each having a ]-shaped groove are attached in a vertically opposite relationship toward the right side end in FIG. 19 to a base plate 21a provided on the bottom.

As shown in FIG. 20A, a pair of openings 21d are formed in a part of the base plate 21a corresponding to a position where the pair of guiding members 21b and 21c are located.

An insertion port 21e for inserting a cartridge 23 into the magnetic recording/regenerating apparatus by guiding a bottom plate 23c of the cartridge described later is formed at the right end of the magnetic recording/regenerating apparatus shown in FIG. 20A.

A pair of leaf springs 22 having a large elastic force with an end screw-fitted and the other end left free are arranged on the back where the guiding members 21b and 21c of the base plate 21 a are located. An engagement section 22a is formed by folding at the tip of the free end of each of the leaf springs 22, and an engaging roller 22b is rotatably supported by the engagement section 22a.

The stopper roller 22b is positioned in an opening 21d of the base plate 21a and is movable vertically with one of the screw-fitting sections as a fulcrum within the opening 21d.

A cartridge 23 represented by a two-point chain line in FIG. 19 is inserted through the insertion port 21e, guided by the guiding members 21a and 21b, and mounted within the apparatus 21. In this cartridge 23, a magnetic tape 23a is housed, and a pair of ]-shaped guide grooves 23b are formed on the both outer sides as shown in FIG. 20B. The pair of guide grooves 23b are guided by the aforementioned rail-shaped guiding members 21b and 21c to guide the cartridge 23 into the apparatus 21.

A notch 23d is formed at a part of a base plate 23c composing the guide grooves 23b of the cartridge 23. A rotatable pinch roller 23f transferring the magnetic tape 23a to the right and to the left via a tape feeding belt 23g is provided in the cartridge 23 in the cartridge 23.

A magnetic head 24 and a transfer roller 25 are arranged in the apparatus 21.

The loading operation for loading the above-mentioned cartridge 23 onto the apparatus 21 comprises first a step of manually inserting the leading end of the cartridge 23 through the insertion port 21eof the apparatus 21 in the arrow D direction.

The leading end of the bottom plate 23c of the cartridge 23 hits the stopper roller 22b of the leaf spring 22.

When the cartridge 23 in this state is pushed into the apparatus by a stronger force, the base plate 23c of the cartridge 23 presses down the stopper roller 22b. As a result, the leaf spring 22 is deflected downward, and the stopper roller 22b comes into elastic contact with the lower side of the bottom plate 23c.

When the cartridge 23 is further into the interior of the apparatus 21, the roller 22b having been pushed down to the lower side of the base plate 23c is positioned at the notch 23d of the cartridge 23, and goes up under the effect of a large elastic force of the leaf spring 22 to the notch 23d. Then, as shown in FIG. 20A, the stopper roller 22b comes into elastic contact with an end of the notch 23d. The stopper roller 22b presses the end of the notch 23d diagonally upward in the arrow C direction. The cartridge 23 comes into contact with a stopper (not shown) in the apparatus 21 to step there, and is loaded in the apparatus 21.

At this point, the pinch roller 23f of the cartridge 23 is in pressure-contact with a transfer roller 25 in the apparatus 21 so as not to allow further incoming of the cartridge 23 into the apparatus 21.

When the transfer roller 25 rotates in the pressure-contact state of the pinch roller 23f and the transfer roller 25, the pinch roller 23f is rotated so as to permit transfer of the magnetic tape 23a to the right or to the left via the tape feeding belt 23g in the cartridge.

When the cartridge 23 is loaded in the apparatus 21, it is possible to record or regenerate prescribed information onto the magnetic tape 23a by means of the magnetic head 24 through rotation of the transfer roller 25 in response to an instruction from an external computer (not shown) or the like.

The ejecting operation of the cartridge 23 from the apparatus 21 comprises manually and strongly pulling the rear end 23e of the cartridge 23 projecting outside the apparatus 21 as shown in FIG. 19 in the arrow E direction. The stopper roller 22b escapes downward from the notch 23d of the cartridge 23, thereby permitting removal of the cartridge 23 from the apparatus 21.

In the conventional apparatus 21 as described above, however, in which engagement and disengagement of the cartridge 23 have been carried out manually, a considerable force (about 1.5 to 3 kgf) has been required for loading and unloading because of the large elastic force of the leaf spring, and it has been a hard work for a powerless person to carry out loading/unloading operation of the cartridge 23.

When one pushes the cartridge 23 into the apparatus 21 by force, the front side of the cartridge often hit a stopper (not shown) in the apparatus, and caused a flaw or breakage of the both.

If a smaller elastic force of the leaf spring 22 is used to facilitate loading/unloading of the cartridge 23, the holding force of the loaded cartridge 13 became insufficient, thus causing slippage of the pinch roller 23f in pressure-contact with the transfer roller 25. This has resulted in unstable feed of the magnetic tape 23a, and has made it impossible to accomplish accurate recording or regeneration.

SUMMARY OF THE INVENTION

As first means for solving the aforementioned problems, the magnetic recording/regenerating apparatus of the present invention comprises an engagement section, a cartridge housing therein a magnetic tape, a first sliding member having a stopper section stopping the engagement section, a second sliding member connected to the first sliding member and causing the first sliding member to slide, and an enclosure permitting individual sliding of the first and the second sliding members; wherein the engagement section of the cartridge is stopped at the stopper section of the first sliding member so that the cartridge can be loaded or unloaded by causing the cartridge to slide under the effect of sliding of the first and the second sliding members.

As second means for solving the aforementioned problems, the magnetic recording/regenerating apparatus of the invention has a configuration in which a junction is provided in the second sliding member; a long-hole-shaped engagement section is longitudinally formed at the other end of said linking member; the junction of the second sliding member is movably engaged with the engagement section of the linking member to connect the linking member and said second sliding member; the linking member rotates under the effect of sliding of the second sliding member; and consequently, the junction of the second sliding member moves apart from the fulcrum of the linking member at the engagement section so that the rotation angle of the linking member to a line perpendicular to the sliding direction of the second sliding member crossing the fulcrum becomes larger.

As third means for solving aforementioned problems, the magnetic recording/regenerating apparatus of the invention has a configuration in which a junction is provided at an end of the linking member; a long-hole-shaped engagement section is formed in a direction perpendicular to the sliding direction of the first sliding member; the junction of the linking member is engaged with the engagement section of the first sliding member to connect the linking member and the first sliding member; the second sliding member is caused to slide to rotate the linking member so that the junction of the linking member moves in the engagement section of the first sliding member to cause the first sliding member to slide.

As fourth means for solving aforementioned problems, the magnetic recording/regenerating apparatus of the invention has a configuration in which the second sliding member comprises a first member and a second member; a pressing section is provided at a part of the first member; there is provided an elastic member stretched between the first member and the second member; and when pressing the pressing section of the first member against an elastic force of the elastic member while mounting the cartridge, the first sliding member slides by the action of the first member via the linking member so as to discharge the cartridge.

DESCRIPTION OF THE PREFERRED EMBODIMENTS

Figure 1:
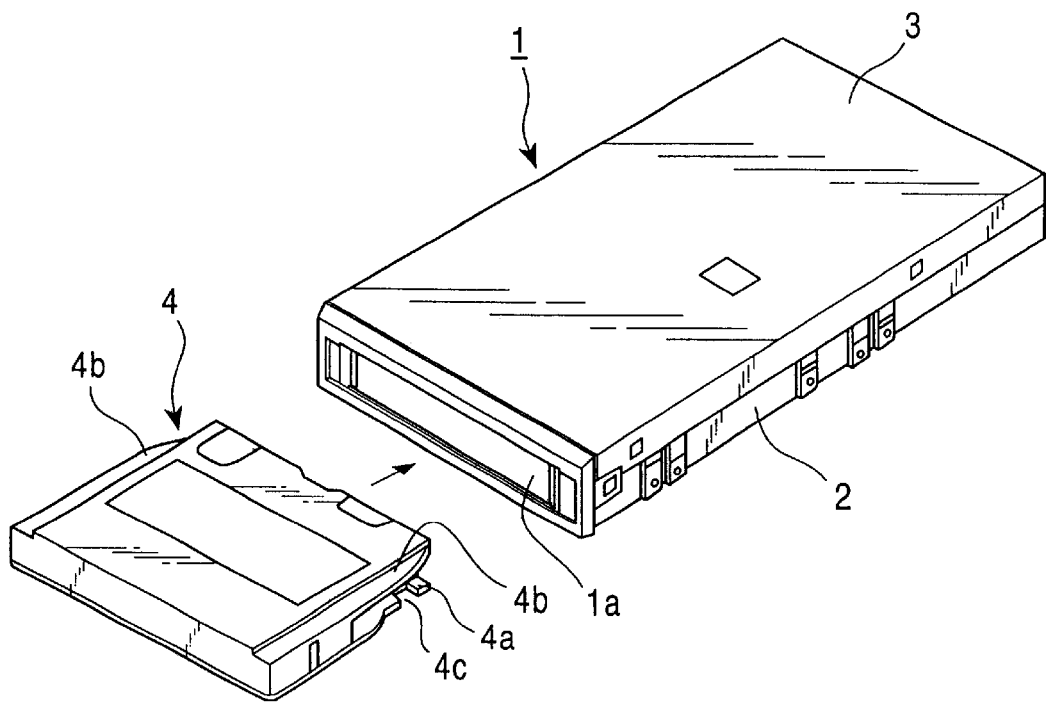
FIG. 1 is a schematic perspective view of the magnetic recording/regenerating apparatus of the present invention and a cartridge.

An embodiment of the magnetic recording/regenerating apparatus of the present invention will be described with reference to FIGS. 1 to 18. The magnetic recording/regenerating apparatus of the invention (hereinafter referred to as the "apparatus 1") has a schematic configuration, as shown in the perspective view of FIGS. 1 and 2, comprising an enclosure 2 attached therein with various parts described later and having a substantially rectangular outer shape, a cover 3 covering the top of the enclosure 2, and an cartridge insertion port 1a formed on the front of the enclosure 2.

The cartridge 4 loaded onto the apparatus 1 has a magnetic tape housed therein, guiding sections 4a and 4b which guide the cartridge 4 into the apparatus 1, formed in a up/down relationship on the both outer sides, and an engagement section 4c notched in the lower guiding section 4a.

Figure 2:
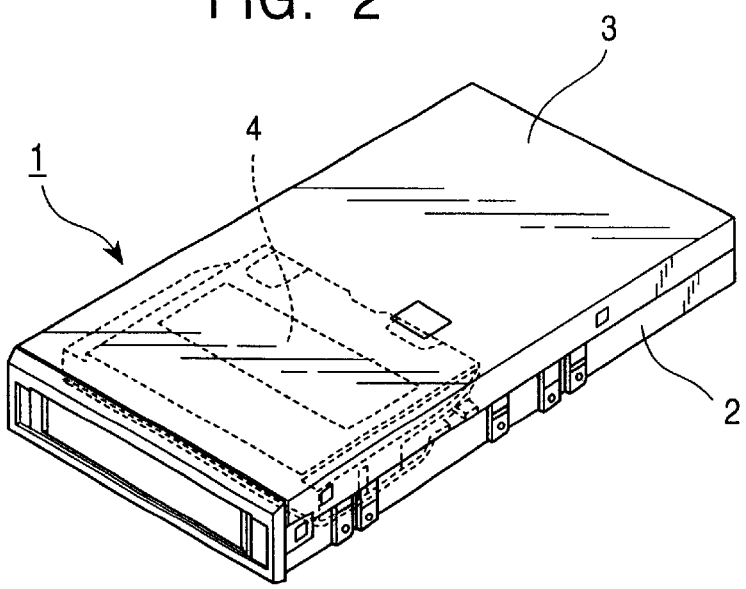
FIG. 2 is a schematic perspective view of the magnetic recording/regenerating apparatus of the invention with a loaded cartridge.

FIG. 2 is an exterior view of the cartridge loaded onto the apparatus 1: the entire cartridge is inserted into the apparatus.

Figure 3:
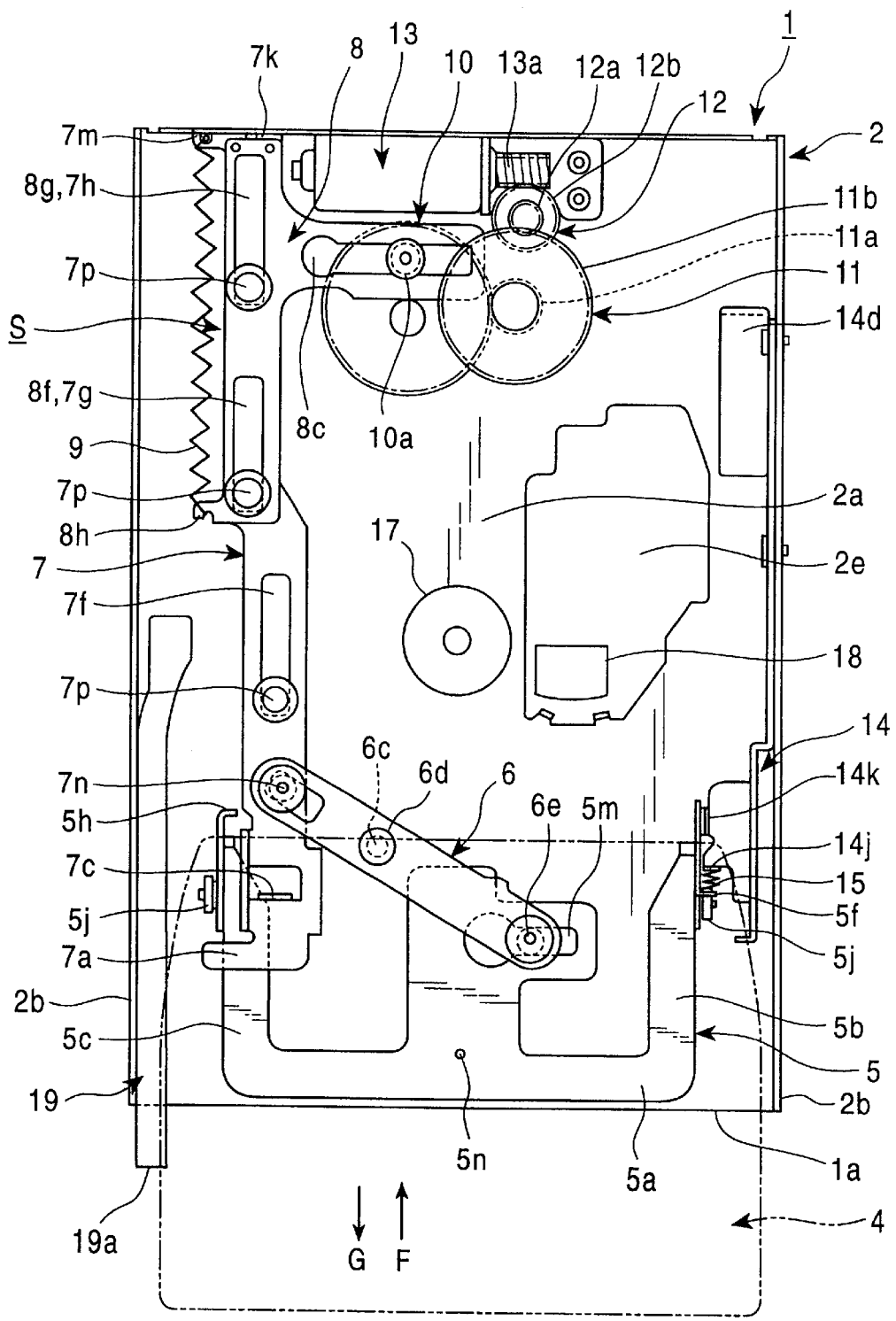
FIG. 3 is a schematic plan view illustrating the interior of an enclosure of the magnetic recording/regenerating apparatus of the invention.

The configuration of the aforementioned apparatus 1 will be described with reference to FIGS. 3 to 18. FIG. 3 is a schematic plan view of the interior of the enclosure 2 of the apparatus 1 as viewed from above after removing the cover 3.

The enclosure 2 housing a plurality of different parts is arranged in the apparatus 1 of the invention. This enclosure 2 is formed into a rectangular exterior shape by press fabrication including stamping and folding of a metal sheet or the like as shown in the plan view of FIG. 4 and the front view of FIG. 5.

The enclosure 2 has a substantially flat bottom plate 2*a* formed on the bottom. A pair of opposed side plates 2*b* and 2*b* are formed by upward bending on the right and the left sides of the bottom plate 2*a* in the drawing.

Figure 4:
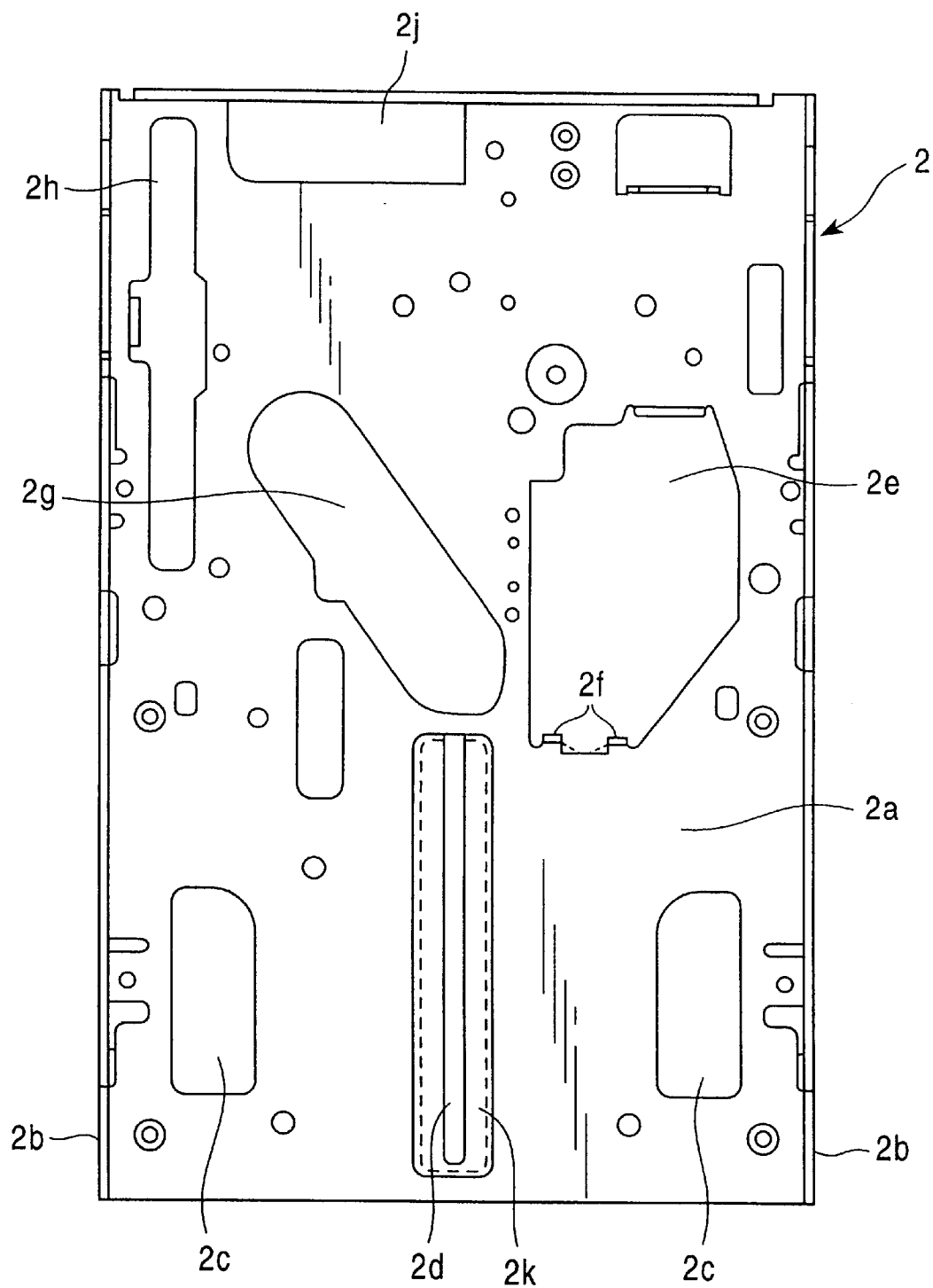
FIG. 4 is a plan view of the enclosure of the magnetic recording/regenerating apparatus of the invention.
Figure 5:
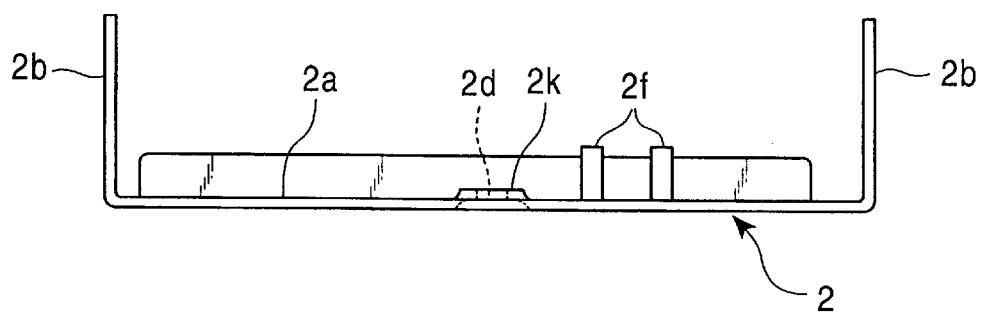
FIG. 5 is a front view of the enclosure of the magnetic recording/regenerating apparatus of the invention.

A pair of the substantially rectangular windows 2*c* and 2*c* are formed by stamping at two positions on the right and left of the bottom plate 2*a* shown at the bottom in FIG. 4. A longitudinally long hole 2*d* shown in FIG. 4 is formed by stamping substantially at the middle between the pair of windows 2*c* and 2*c*.

A protrusion 2*k* is formed, projecting from the back of the bottom plate 2*a*, around this long hole 2*d*.

A substantially rectangular head attachment hole 2*e* is formed by stamping to the right above the long hole 2*d*, and two stoppers 2*f* are formed by notching upward on the inner surface of the head attachment hole 2*e* toward the bottom of FIG. 4.

A driving belt is stretched around a transfer roller 17 described later and a driving source not shown from the top diagonally to the left above of the long hole 2*d* in FIG. 4, and an escape hole 2*g* for the driving belt is formed in substantially an oval shape. A longitudinally long opening 2*h* is formed by stamping near a side plate 2*b* to the left of the escape hole 2*g* in the drawing.

A substantially rectangular motor attachment hole 2*j* for attachment of the driving source 13 which causes the cartridge 4 to side for loading/unloading is formed toward the left of the top end of FIG. 4, and a plurality of small-diameter round holes are formed by stamping around the proximity to the motor attachment hole 2*j*.

Figure 6:
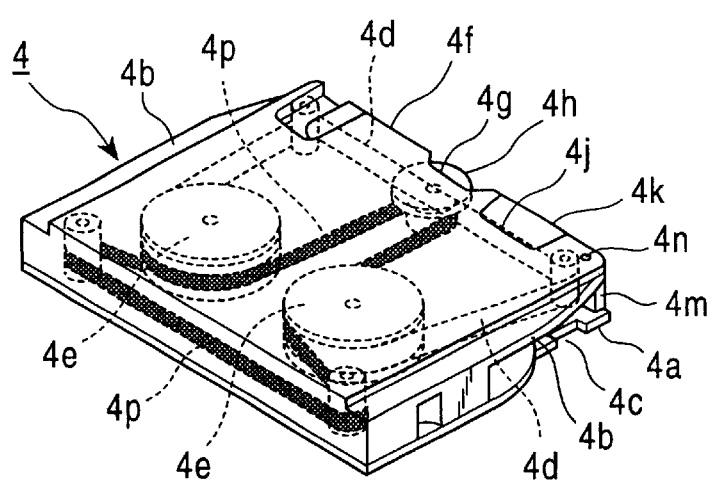
FIG. 6 is a perspective view of a cartridge used in the magnetic recording/regenerating apparatus of the invention.

The cartridge 4 loaded onto the apparatus 1 into a box-like exterior shape, and as shown in FIG. 6, two guiding sections 4*a* and 4*b* are formed so as to project outside in a rail shape at the top and the bottom, respectively, of the right and left sides. A notched engagement section 4*c* is formed on the lower guiding section 4*a*.

A magnetic tape 4*d* is housed in the cartridge 4, and the both ends of the magnetic tape 4*d* are wound on rotatable reels 4*e* and 4*e*, respectively.

A notch 4*g* is formed at the center portion of the front side 4*f* of the cartridge 4. A part of the periphery is exposed from this notch 4*g*, and a rotatable pinch roller 4*h* is arranged. In linkage with rotation of the pinch roller 4*h*, the reels 4*e* and 4*e* rotate clockwise or anticlockwise via a tape feed belt 4*p* so as to permit winding or unwinding of the magnetic tape 4*d* onto or from the reels 4*e* and 4*e*.

To the right of the notch 4*g* of the cartridge 4, an opening 4*j* for exposing the magnetic tape 4*d* to the front side 4*f* and causing the magnetic tape 4*d* to slide to the magnetic head 18 described later is formed, and a cover 4*k* capable of being opened and closed is provided on the opening 4*j*.

An end portion 4*m* is formed on the cover 4*k* on the right side in the drawing. This end portion 4*m* is supported by a supporting pin 4*n* to make the cover 4*k* rotatable.

A twist coil spring (not shown) is wound around the supporting pin 4*n* so that, when the cartridge 4 is not loaded onto the apparatus 1, the cover 4*k* always closes the opening 4*j* so as to prevent ingression of dust or waste into the cartridge 4.

A first sliding member 5 for stopping the cartridge 4 when the cartridge 4 is inserted into the enclosure as shown in FIG. 3, and causing the cartridge to slide in the arrow F direction for loading onto the apparatus 1 is arranged on the case plate 2*a* of the enclosure 2.

Figure 7:
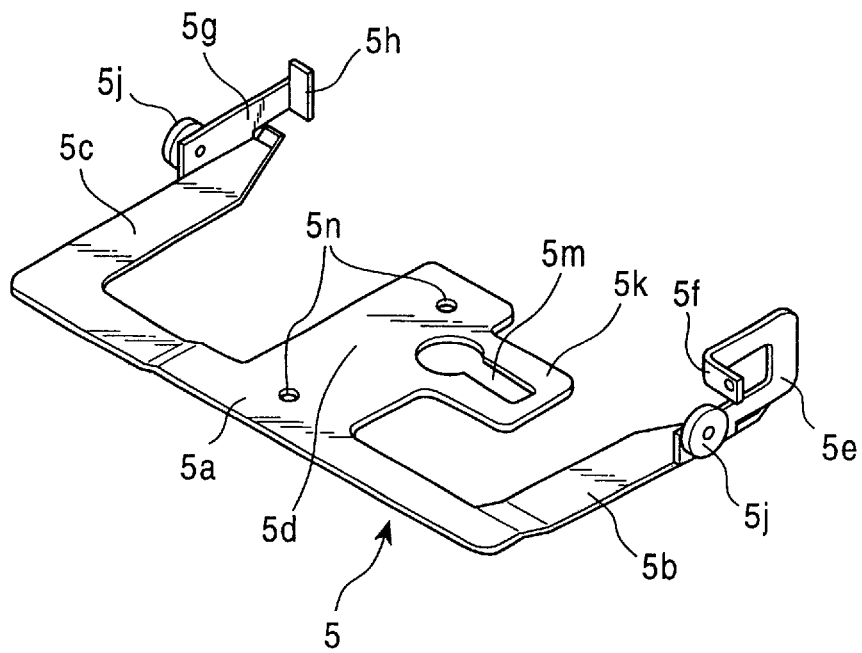
FIG. 7 is a perspective view of a first sliding member of the magnetic recording/regenerating apparatus of the invention.

The first sliding member 5 comprises a metal plate such as a stainless steel plate having a spring function, has a base 5*a* provided on this side in the drawing, arms 5*b* and 5*c* arranged on the right and left sides of the base 5*a* and a flat link support 5*d* at the center as shown in the perspective view of FIG. 7, and presents a substantially E-shaped exterior configuration.

A substantially U-shaped roller holder 5*e* is folded upward toward the leading end of the arm 5*b* to the right in FIG. 7. The end on this side above the roller holder 5*e* is folded outward at right angles to form an opening/closing section 5*f*. When the cartridge 4 is inserted into the apparatus 1, the opening/closing section 5*f* is brought into contact with an end 4*m* of the cover 4*k* of the cartridge 4, thus causing the cover 4*k* to open forward though rotation of the cover 4*k*.

Another roller holder 5*g* folded upward is provided toward the leading end of the arm 5*c* of the base 5*a* to the left in the drawing. The roller holder 5*g* is opposed to the roller holder 5*e* on the right side.

The leading end of the roller holder 5*g* is folded inward by right angles to form a stopper 5*h*. The stopper 5*h* comes into contact with the front side 4*f* of the cartridge 4 upon mounting the cartridge 4 onto the first sliding member 5 so as to prevent the cartridge 4 from being pushed into beyond the stopper 5*h*.

A pair of stoppers 5*j* and 5*j* comprising stopper rollers are rotatably bearing-supported at opposite positions on the outside of the roller holders 5*e* and 5*g*.

A protrusion 5*k* projecting in the direction of the arm 5*d* the right in the drawing is formed toward the leading end of the link support 5*d*. A long-hole-shaped engagement section 5*m* is formed by stamping in the protrusion 5*k* in the arrow F direction, or in a direction perpendicular to the sliding direction in the arrow G direction.

Two attachment holes 5*n* for slidably attaching the first sliding member 5 to the long hole 2*d* of the enclosure 2 is formed in the link support 5*d*.

The first sliding member 5 as described above is slidably provided on the bottom plate 2*a* of the enclosure 2 to permit sliding of the aforementioned stoppers 5*j* and 5*j* on the windows 2*c* and 2*c* and on the bottom plate 2*a*.

Figure 8A:
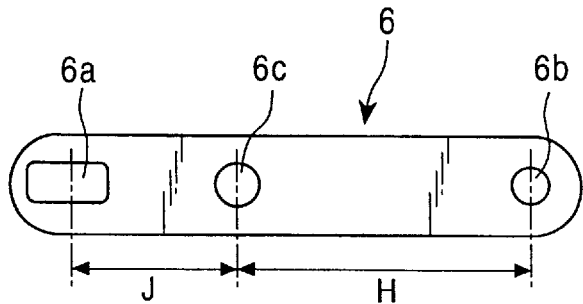
FIG. 8 covers a plan view and a sectional side view of a linking member of the magnetic recording/regenerating apparatus of the invention.
Figure 8B:
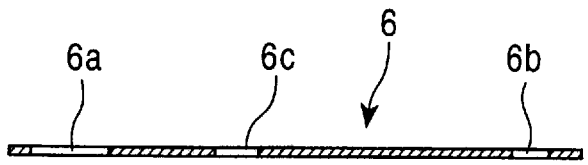

An end of the linking member 6 is engaged with the engagement section 5*m* of the first sliding member 5 as shown in FIG. 3. The linking member 6 comprises a flat metal plate or the like as shown in FIG. 8, and a long-hole-shaped engagement section 6*a* is formed by stamping in the longitudinal direction on the other end side to the left of the linking member 6 in FIG. 8.

On one end side to the right in the drawing, a round hole 6*b*, and a support hole 6*c* between the round hole 6*b* and the engagement section 6*a* on the other end side are formed by stamping or the like.

In the linking member 6, as shown in FIG. 3, the support hole 6*c* is formed between the round hole 6*b* on one end side and the engagement section 6*a* on the other end side. This support hole 6*c* is rotatably supported by a fulcrum 6*d* comprising a supporting pin attached to the bottom plate 2*a* of the enclosure 3 and can rotate clockwise or anticlockwise.

A junction 6*e* is supported by the round hole 6*b* on one end side of the linking member 6. The linking member 6 and the first sliding member 5 are connected by engaging the junction 6*e* with the engagement section 5*m* of the first sliding member 5, and the linking member is rotated by causing the second sliding member to slide. Then, the junction 6e moves within the engagement section 5m of the first sliding member 5, thus causing the first sliding member 5 to slide in the arrow F and G directions shown in FIG. 3.

A second sliding member S as shown in FIG. 3 is connected to the engagement section 6a on the other end side of the linking member 6. The linking member 6 has such a configuration that, with the support hole 6c as a fulcrum 6d as shown in FIG. 8, the distance between the fulcrum hole 6c serving as the fulcrum 6d and the engagement hole 6a on the other end side connecting the second sliding member S is smaller than the distance H between the fulcrum 6d and the round hole 6b on the one end side connecting the first sliding member 5.

The second sliding member S connected to the engagement section 6a is slidably supported on the bottom plate 2a of the enclosure 2, and comprises a first member 7 on the lower side and a second member 8 on the first member 7. These first and second members 7 and 8 are formed by stamping by a press or the like a metal sheet.

Figure 9:
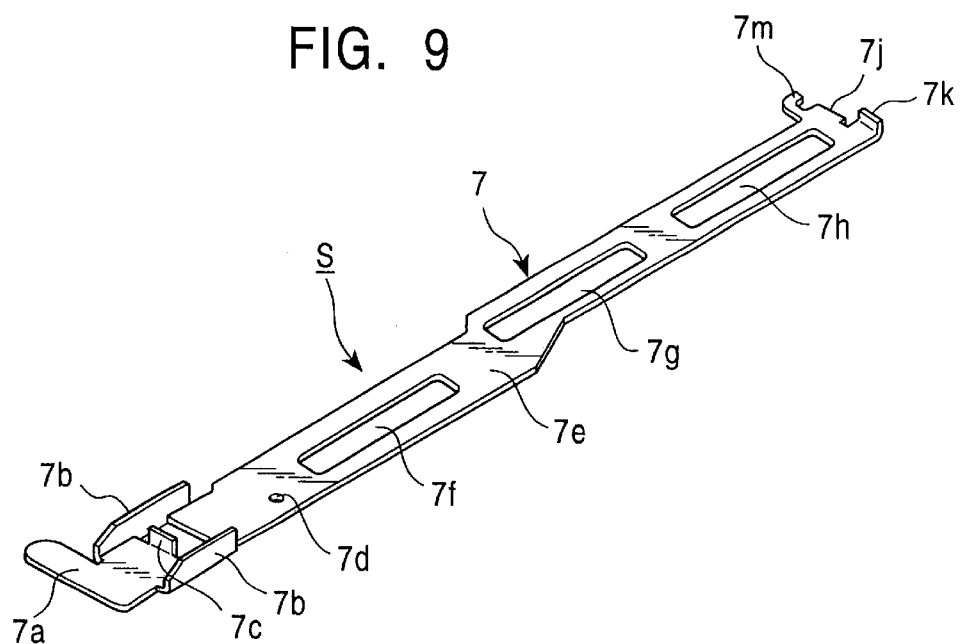
FIG. 9 is a perspective view of a first member of the second sliding member of the magnetic recording/regenerating apparatus of the invention.

As shown in the perspective view of FIG. 9, in the first member 7, a leading end 7a on this side in FIG. 9 is formed into substantially an L shape, and the right and left sides near this leading end 7a are folded upward in an opposite relationship to form two guides 7b and 7b.

A flat portion between the two guides 7b and 7b is cut and folded upward to form a pressing section 7c.

Behind the guides 7b and 7b, there is formed an attachment hole 7d of a prescribed bore diameter, and a flat portion 7e is formed behind the attachment hole 7d in the drawing.

An attachment hole 7f is formed by stamping in the flat portion 7e on the front side, and two attachment holes 7g and 7h are formed also by stamping in the flat portion 7e on the back side, both with prescribed width into longitudinally long shapes.

The two attachment holes 7g and 7h on the back side are formed with a slight shift to the left in the drawing relative to the attachment hole 7f on the front side.

A stopper 7k is formed by folding the right side in the drawing upward in the rear end 7j of the first member 7, and a spring stopper 7m having a protrusion projecting from the flat portion 7e is formed on the left side of the rear end 7j.

The first member 7 having the above-mentioned configuration has a junction 7n attached by caulking to the attachment hole 7d as shown in FIG. 3. The junction 7n is inserted into the engagement section 6a of the linking member 6. The other end side of the linking member 6 is prevented from coming off by a stop ring (not shown) or the like, and the junction 7n is slidably supported by the first member 7 of the second sliding member S.

When the first member 7 is caused to slide in the arrow F or G direction, the junction 7n attached to the first member 7 moves within the engagement section 6a of the linking member 6, causes the linking member 6 to rotates, and causes the first sliding member connected to one end side of the linking member 6 to slide in a direction counter to the sliding direction of the second sliding member S. For example, when the second sliding member S slides in the arrow G direction, the first sliding member 5 slides in the arrow F direction.

The first member 7 is supported by these fixing pins 7p fixed by caulking or the like to the bottom plate 2a of the enclosure 2 shown in FIG. 3, inserted into the three attachment holes 7f, 7g and 7h and can slide on the bottom plate 2a in the longitudinal direction in FIG. 3.

Figure 10:
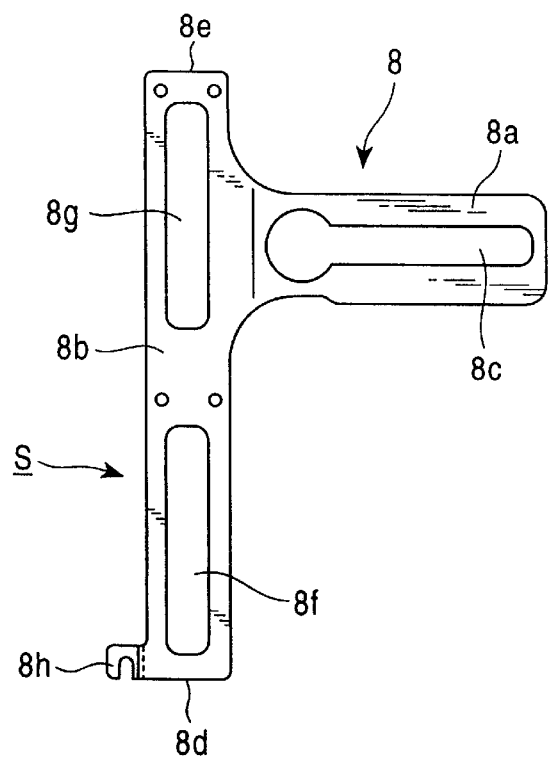
FIG. 10 is a plan view of a second member of the second sliding member of the magnetic recording/regenerating apparatus of the invention.

The second member 8 as shown in FIG. 10 is slidably provided on the flat portion 7e toward the rear end 7j of the first member 7.

The second member 8 of the second sliding member S comprises a metal sheet or the like, has a transversely extending base 8a and a longitudinally long support 8b at right angles to the base 8a, and present a substantially T-shaped exterior form.

A laterally long cam groove 8c is formed by stamping on the base 8a, with a substantially rectangular end and the other round end. A leading end 8d is formed under the support 8b in the lower part of the drawing, and a rear end 8e, in the upper part thereof. Two longitudinally long rectangular attachment holes 8f and 8g are formed by stamping on the support 8b. A spring stopper 8h having a recess is formed so as to project to the left of the leading end 8d of the support 8b.

The second member 8 having the configuration as described above is slidably attached onto the first member 7, with the attachment holes 8f and 8g inserted to the two fixing pins 7p and 7p in engagement with the two attachment holes 7g and 7h of the first member 7.

In the second sliding member S, an elastic member 9 comprising a coil spring or the like is stretched between the spring stoppers 7m and 8h of the first member 7 and the second member 8, respectively, and the rear end 8e of the second member 8 is in contact with the stopper 7k of the first member 7 under the effect of elastic force of the elastic member 9.

When the second member 8 is caused to slide, the first member 7 slides via the elastic member 9 in the same direction as the second member 8, thus causing the linking member to rotate.

A cam member 10 comprising a metal plate or the like and having gear formed on the outer periphery thereof is arranged on the lower surface of the base 8a of the second member 8, and this cam member 10 is rotatably supported by the bottom surface 2a of the enclosure 2. A driving pin 10a is attached by caulking to a position spaced apart from the rotational center of the cam member 10.

A two-stage gear 11 comprising pinion gear 11a engaging with the gear on the outer periphery of the cam member 10 and a large-diameter plain gear 11b is arranged to the right of the cam member 10. The two-stage gear 11 is rotatably supported by the bottom plate 2a of the enclosure 2.

Above the two-stage gear 11, there is provided a two-stage pinion 12 engaging with the plain gear 11b of the two-stage gear 11. The two-stage pinion 12 is rotatably supported by the bottom plate 2a of the enclosure 2. In the two-stage pinion 12, pinion gears having different diameters are integrally formed in the upper and the lower parts thereof. In the upper part, a small pinion gear 12a engaging with the plain gear 11b of the two-stage gear 11 is formed, and in the lower part, a large pinion gear 12b having an exterior shape larger than the small pinion gear 12a is formed.

A driving source 13 comprising a motor or the like is attached to a motor attachment hole 2j above the cam member 10. A worm gear 13a is attached under a pressure to a rotation shaft of the driving source 13, and this worm gear 13a engages with the large pinion 12b of the two-stage pinion 12.

Figure 11:
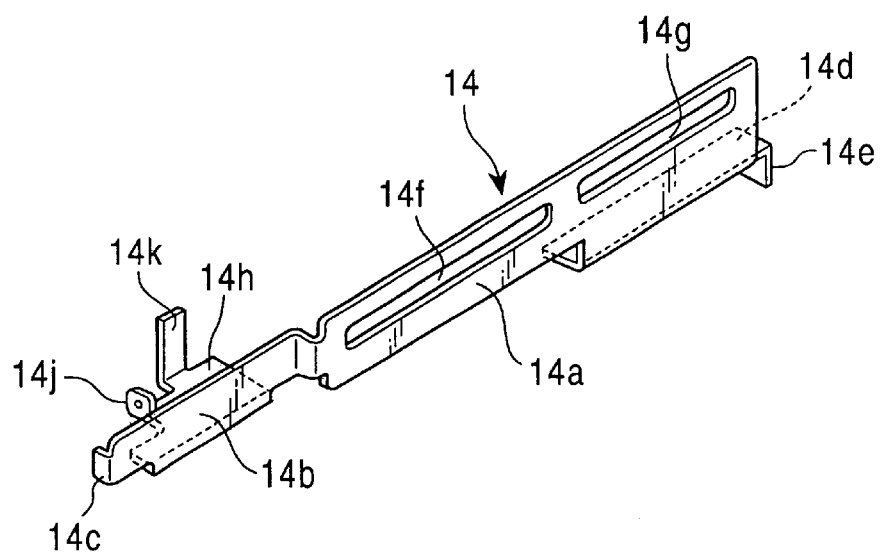
FIG. 11 is a perspective view of an operating member of the magnetic recording/regenerating apparatus of the invention.

A longitudinally long operating member 14 as shown in FIG. 11 is slidably attached to the side plate 2b to the right of the enclosure 2 shown in FIG. 3. The operating member 14 comprises a metal plate or the like and has an attachment section 14a for slidably attaching to the side plate 2b to the right, and an arm 14b folded in a stair shape to the left from the attachment section 14a. The front side end of the arm 14b is folded to the left to form a leading end 14c.

The lower side of the attachment section 14a is folded to the left to form a flat operating section 14d, and a rear end 14e linked with the operating section 14d is formed by folding downward.

Two attachment holes 14f and 14g are formed linearly by stamping in the longitudinal direction of the attachment section 14a toward the upper end of the attachment section 14a.

A bottom plate 14h is formed by folding the lower side of the arm 14b to the left. The front end of this bottom plate 14h is folded upward to form a spring stopper 14j. A round hole is formed in this spring stopper 14j.

On the left side opposite to the arm 14b, there is formed a contact section 14k comprising the left end of the bottom plate 14h folded upward.

When mounting the cartridge 4 onto the first sliding member 5, the contact section 14k is pressed at the right end on the front side 4f of the cartridge 4, and the operating member 14 also moves while sliding into the apparatus 1 together with the cartridge 4.

A coil spring 15 is stretched between the respective round holes of the spring stopper 14j of the operating member 14 and the opening/closing section 5f of the first sliding member 5. Upon ejecting operation for removing the cartridge 4 loaded in the apparatus 1, the first sliding member 5 slides in the arrow G direction. The operating member 14 is pulled by the coil spring 15 so that the operating member 14 also slides in the arrow G direction toward the cartridge insertion port 1a.

A transfer roller 17 rotatable by a driving source (not shown) other than the aforesaid driving source 13 is provided to the left of the head attachment hole 2e of the bottom plate 2a of the enclosure 2 shown in FIG. 3. A friction member such as rubber is attached to the outer periphery of the transfer roller 17 so as to prevent the pinch roller 4h from slipping when the pinch roller 4h of the cartridge 4 rotates as a result of pressure contact.

A magnetic head 18 attached to a member not shown is arranged toward the two stoppers 2f of the head attachment hole 2e.

A longitudinally long ejection button 19 slidably attached on the front side of the side plate 2b to the left of the enclosure 2.

Operations of the apparatus 1 of the invention having the configuration as described above will now be described. In the interior of the apparatus 1 prior to inserting the cartridge 4, the first sliding member 5 is positioned on the cartridge insertion port 1a, and the stoppers 5j and 5j comprising a pair of stopper rollers are located at the respective windows 2c and 2c of the enclosure.

The loading operation of the cartridge 4 represented by a two-point chain line into the apparatus 1 in this state first comprises a step of inserting the cartridge 4 in the arrow F direction through the cartridge insertion port 1a.

The right and left guides 4a and 4b of the cartridge 4 are guided by guiding rails (not shown) provided on the right and left side plates 2b and 2b of the enclosure 2 near the cartridge insertion port 1a, and the cartridge 4 comes into the enclosure 2.

Figure 12:
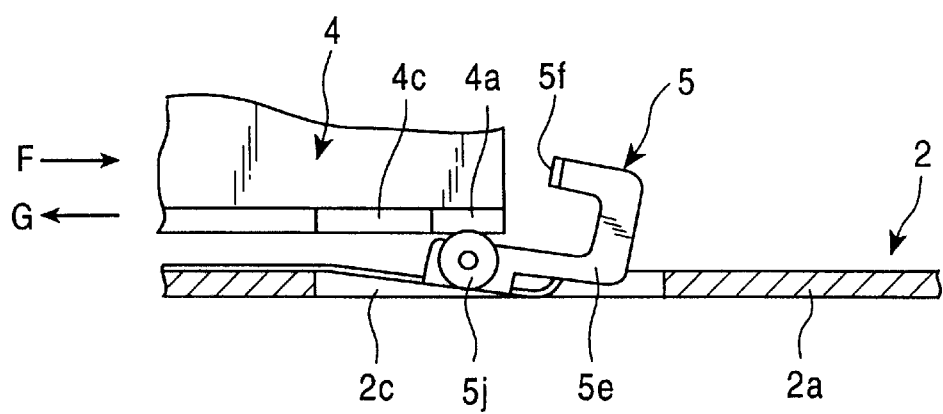
FIG. 12 is a partial sectional side view illustrating operations of the magnetic recording/regenerating apparatus of the invention.

Then, as shown in FIG. 12, the leading end of the guide 4a of the cartridge 4 presses down the stopper 5j of the first sliding member 5 into the window 2c of the enclosure 2.

When the cartridge 4 is further pushed into the apparatus from this state, and end 4m, of the cover 4k of the cartridge 4 comes into contact with the opening/closing section 5f of the first sliding member 5, and the cover 4k is opened toward the front of the cartridge 4.

Figure 13:
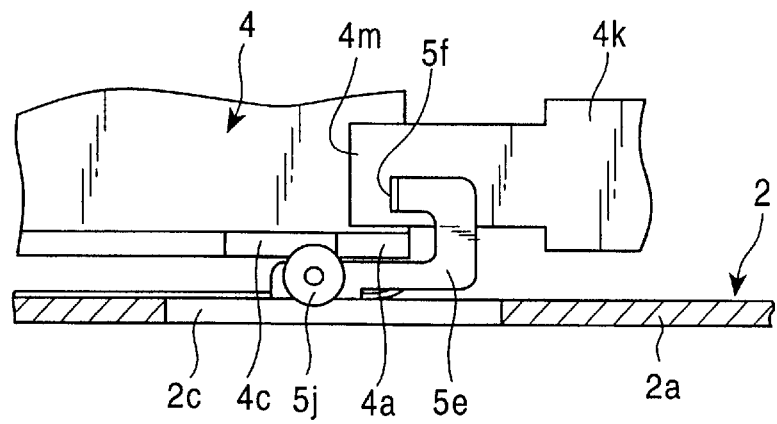
FIG. 13 is a partial sectional side view illustrating operations of the magnetic recording/regenerating apparatus of the invention.

Simultaneously with opening operation of the cover 4k, or after opening the cover 4k, the stopper 5j having been pressed down into the window 2c of the enclosure 2 is located at the engagement section 4c at the position of the window 2c as shown in FIG. 13 by pushing further the cartridge 4 into the apparatus 1. The stopper 5j elastically restores its original horizontal condition, and stops the engagement section 4c of the cartridge 4.

Elastic restoration of the stopper 5j into the horizontal condition creates a click feeling of the cartridge 4 inserted manually, thus allowing the operator to recognize that the stopper 5j of the first sliding member 5 has stopped the cartridge 4.

Inertia from insertion of the cartridge 4 into the apparatus 1 pushes the cartridge 4 further into the apparatus 1. However, the left end of the front side 4f of the cartridge 4 coming in contact with the stopper 5h of the first sliding member 5 prevents the cartridge 4 from being inserted further into the apparatus 1.

As a result of operation of mounting the cartridge 4 onto the first sliding member 5 brings the right end of the front side 4f of the cartridge 4 into contact with the contact section 14k, thus causing the operating member 14 to move inward in the apparatus 1.

Then, an operating section 14d of the operating member 14 starts a detecting member (not shown) comprising a switch or the like to turn on the same. Upon turn-on of this detecting member, rotation of the driving source 13 comprising a motor or the like is started.

Rotation of the driving source 13 is transferred to the two-stage gear 11 and the cam member 10 via the two-stage pinion gear 12 shown in FIG. 3 to cause the cam member 10 to rotate.

Figure 15:
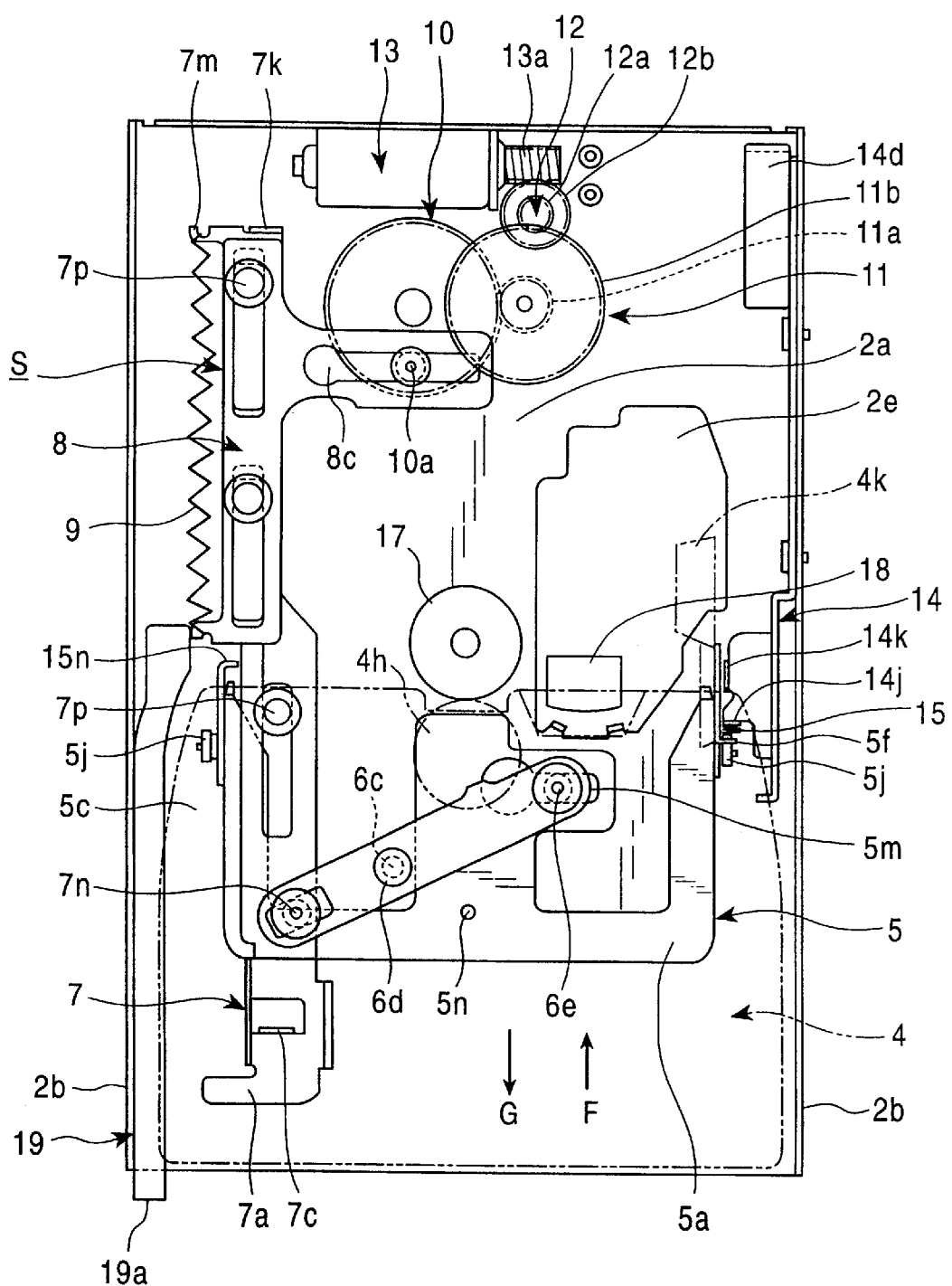
FIG. 15 is a schematic plan view illustrating operations of the magnetic recording/regenerating apparatus of the invention.

Along with rotation of the cam member 10, a driving pin 10a located in the upper part moves through the cam groove 8c of the second member 8 of the second sliding member S to a position in the lower part as shown in FIG. 15, and this driving pin 10a causes the second member 8 to slide in the arrow G direction.

Figure 16:
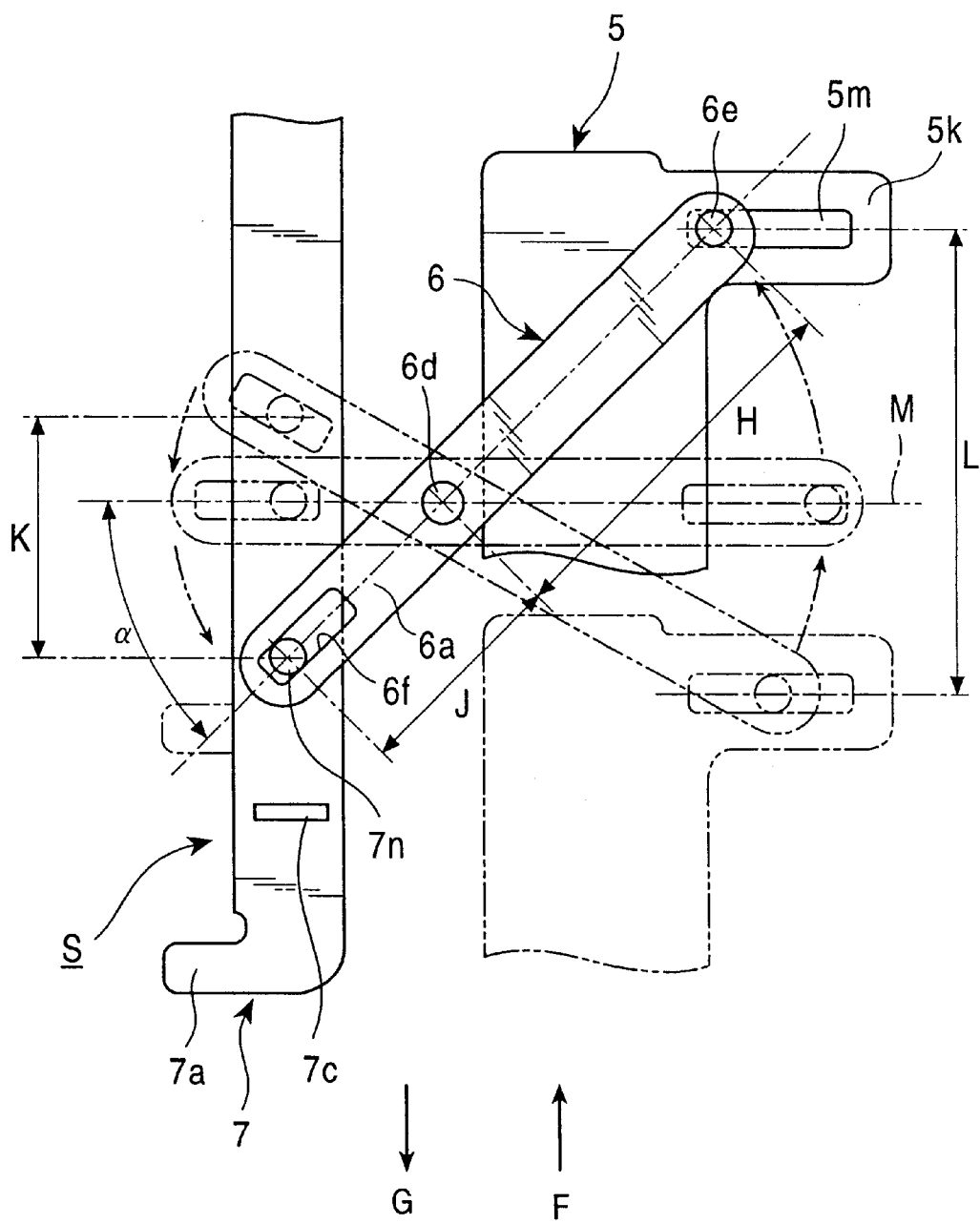
FIG. 16 is a schematic view illustrating operations of the linking member of the magnetic recording/regenerating apparatus of the invention.

Then, the first member 7 slides also in the same arrow G direction as that of the second member 8 via the elastic member 9, and as a result, the linking member 6 inclining with the left shoulder there of upward, represented by a two-point chain line in FIG. 16 rotates anticlockwise around the fulcrum 6d. The junction 7n of the second sliding member S spaced apart diagonally upward from the fulcrum 6d approaches the fulcrum 6d. The linking member 6 becomes in parallel with a line M perpendicular to the sliding direction of the second sliding member S crossing the fulcrum 6d. The junction 7n of the second sliding member S thus becomes the closest to the fulcrum 6d.

Anticlockwise rotation of the linking member 6 causes the first sliding member 5 mounting the cartridge 4 to slide in the arrow F direction, counter to the sliding direction of the second sliding member S.

Figure 14:
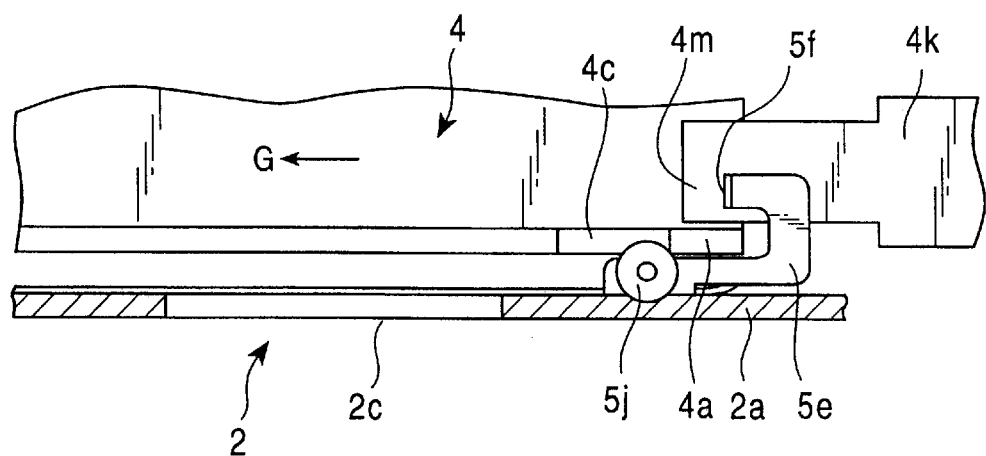
FIG. 14 is a partial sectional side view illustrating operations of the magnetic recording/regenerating apparatus of the invention.

The stopper 5j located at the window 2c of the bottom plate 2a moves by sliding onto the bottom plate 2a of the enclosure 2 as shown in FIG. 14. Downward movement of the stopper 5j is thus regulated, thus permitting maintenance of stoppage of the engagement section 4c of the cartridge 4 with the stopper 5j.

As a result, even if it is tried to take out the cartridge 4 from the apparatus, the stopper 5j cannot escape downward, thus preventing removal of the cartridge from the apparatus 1.

When the cartridge 4 is arrested by the stopper 5j, and further, the driving source 13 is activated as described above, sliding of the second sliding member S in the arrow G direction causes the linking member 6 further to rotate anticlockwise with the left shoulder thereof moving downward as shown by a solid line in FIG. 16. As a result, the junction 7n is spaced apart from the fulcrum at the engagement section 6a, and the rotation angle α of the linking member relative to line M crossing at right angles becomes larger.

Figure 17:
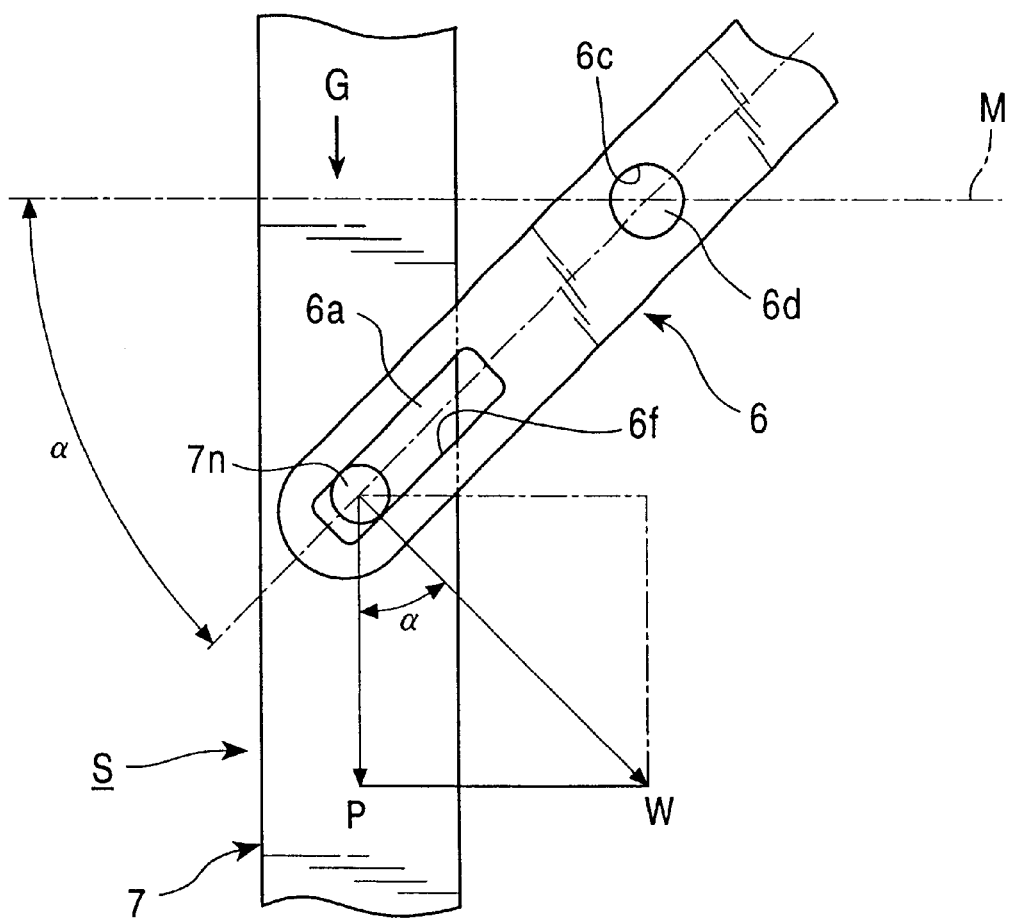
FIG. 17 is a schematic view illustrating forces acting on the linking member of the magnetic recording/regenerating apparatus of the invention.

In the junction 7n at this point, as shown in FIG. 17, a pressing force P is applied vertically downward onto one side wall 6f of the engagement section 6a of the linking member 6 having rotated diagonally downward, and there is applied a force W to rotate the linking member 6 in a direction perpendicular to a side wall 6f of the engagement section 6a. The pressing force P of the function 7n and the force W acting on the linking member 6 are in a relationship $W = P \times \cos \alpha$.

For example, when the linking member 6 has a rotation angle α of 45°, $W = P \times \cos 45° (\sqrt{2})$: the force W acting on the linking member 6 would therefore be $\sqrt{2}$ times as large as the force P causing the second sliding member S to slide.

More particularly, according as the junction 7n becomes more distant from the fulcrum and the rotation angle α of the linking member 6 becomes larger, it is possible to increase the force W acting on the linking member 6 without the need to change the pressing force P of the junction 7n of the second sliding member S.

When the pinch roller 4h of the cartridge 4 is brought into pressure-contact with the transfer roller 17 as a result of sliding of the first sliding member 5 in the arrow F direction, the cartridge 4 is loaded in the apparatus 1, completing the loading operation, and driving of the driving source 13 is discontinued.

At this point, the magnetic tape 4d comes into sliding contact with the tape sliding contact surface of the magnetic head 18, and sliding of the first sliding member 5, and the second sliding member S is discontinued.

Since the junction 7n is spaced apart from the fulcrum, and the rotation angle α of the linking member 6 becomes larger, the force W acting on the linking member 6 becomes larger, thus permitting pressure-contact of the pinch roller 4h of the cartridge 4 with the transfer roller 17 with a larger force.

In the linking member 6, as shown in FIG. 16, the distance J between the fulcrum 6d and the engagement section 6a on one end side connecting the second sliding member S is smaller than the distance H between the fulcrum and the junction 6e on the other end side connecting the first sliding member 5. It is therefore possible to increase the amount of displacement on the other end side over the amount of displacement on one end side of the linking member 6.

As a result, it is possible to increase the amount L of sliding of the first sliding member 5 by an operation of loading or unloading the cartridge 4 into or from the apparatus 1, even with a small amount K of sliding of the second sliding member S.

The force W for rotating the linking member 6 can be increased by increasing the rotation angle α of the linking member 6. Even when the distance J is smaller than the distance H of the linking member 6, therefore, the force causing the first sliding member 5 to slide in the arrow F direction can be increased.

Upon completion of the loading operation of the cartridge and stoppage of driving of the driving source 13, the transfer roller 17 is rotated by rotating a driving source not shown other than the driving source 13 in response to an instruction from an external computer (not shown) or the like, to cause the pinch roller 4h to rotate.

The magnetic tape 4d is transferred by rotating the reel 4e via a tape feed belt 4p in linking with rotation of the pinch roller, thereby permitting recording and regeneration onto and from the magnetic tape by the magnetic head 18.

The ejecting operation for taking out the cartridge from the apparatus 1 comprises a step of pressing the leading end 19a of an eject button 19 projecting from the apparatus 1: the other end of the eject button 19 in the interior of the apparatus 1 turns on a switch not shown.

The driving source 13 is started: cam member 10 rotates, and the driving pin 10a moves upward as shown in FIG. 3. The second sliding member S moves in the arrow F direction. Then, the linking member 6 rotates clockwise around the fulcrum 6d. The first sliding member 5 connected to the junction 6e of the first sliding member 5 moves in the arrow G direction, and the first sliding member 5 slides to the cartridge insertion port 1a side.

Then, in a state in which the stopper 5j of the first sliding member 5 having been positioned on the bottom plate 2a shown in FIG. 14 stops the cartridge 4, the rear end of the cartridge 4 represented by a two-point chain line in FIG. 3, located at the window 2c of the bottom plate 2a of the enclosure 2 shown in FIG. 13 is discharged outside the apparatus 1, and the ejecting operation of the cartridge 4 is completed.

When the cartridge 4 is removed in this state, the stopper 5j is pressed by the guide section 4 of the cartridge 4 into the window 2c below and escapes downward, thereby permitting easy removal of the cartridge 4 from the apparatus 1.

More specifically, with the apparatus 1 of the invention, when the stopper 5j is located at the window 2c of the bottom plate 2a, the engagement section 4c of the cartridge 4 can be disengaged with the stopper 5j by causing the stopper 5j to move up and down through loading/unloading operation of the cartridge 4 onto and from the first sliding member 5.

Figure 18:
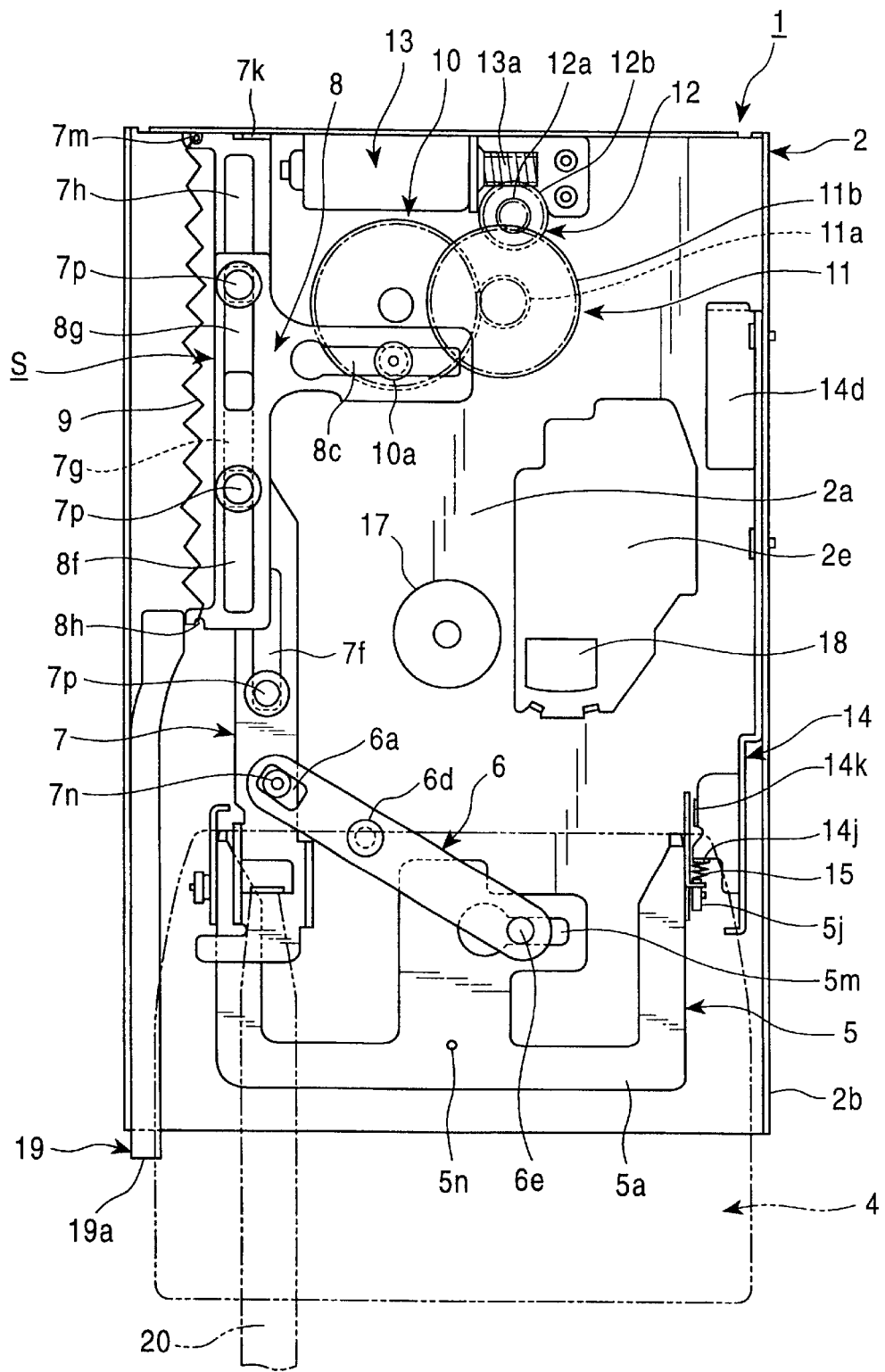
FIG. 18 is a schematic view illustrating manual ejection of the magnetic recording/regenerating apparatus of the invention.
Figure 19:
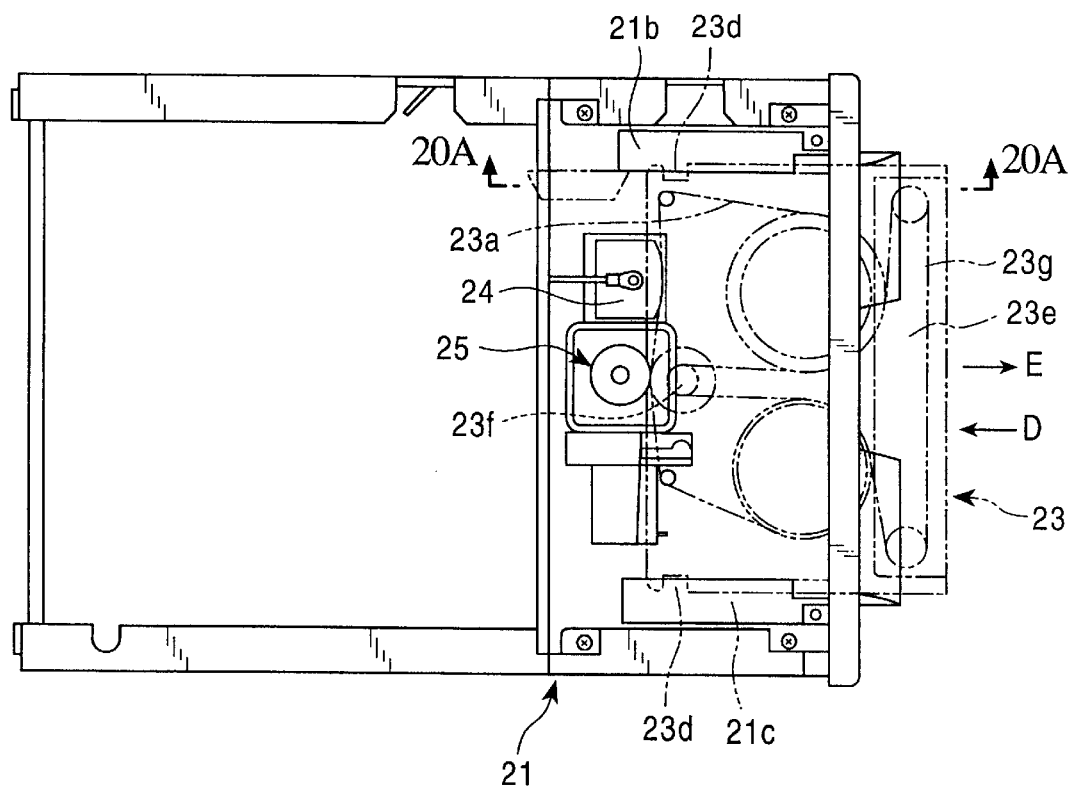
FIG. 19 is a schematic plan view of the conventional magnetic recording/regenerating apparatus.
Figure 20A:
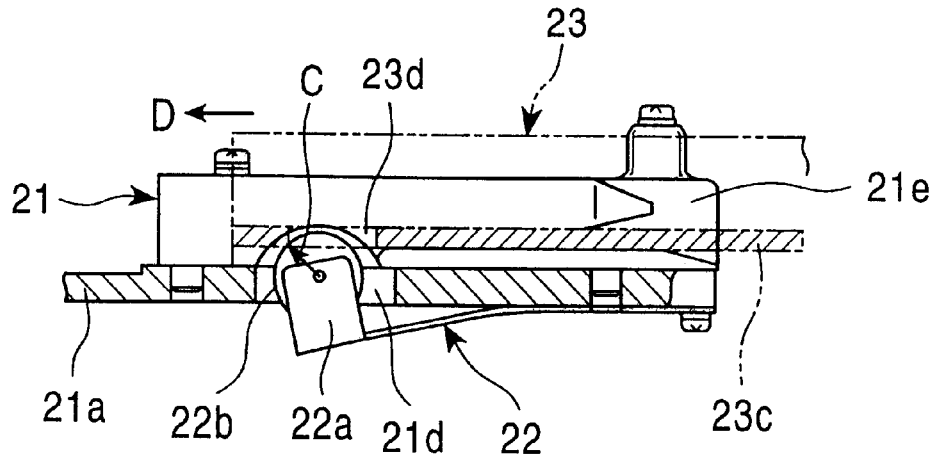
FIG. 20 covers a partial sectional view and a partial side view of the conventional magnetic recording/regenerating apparatus.
Figure 20B:
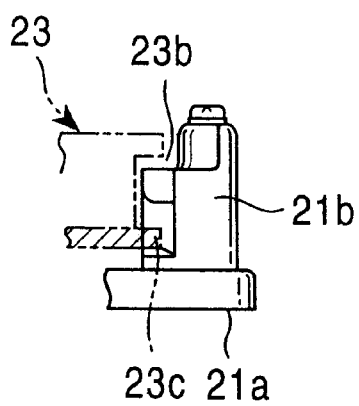

In the apparatus 1 of the invention, in a state in which the driving source 13 stops after the completion of loading of the cartridge 4, it is possible to perform the ejecting operation for discharging the cartridge 4 by inserting a pressing member 20 comprising a driver or the like from the cartridge insertion port 1a side in front of the apparatus 1 as shown in FIG. 18 and pressing the pressing section 7c of the first member 7 against the elastic force of an elastic member 9 comprising a tensile coil spring, thus causing the first sliding member 5 to slide via the linking member 6 by the action of the first member 7.

As a result, even when the driving source 13 is prevented to work by some problem or other such as power failure, manual ejection of manually discharging the cartridge 4 in the loaded state can easily be conducted.

The magnetic recording/regenerating apparatus of the present invention has a configuration in which the portion between one end and the other end of the linking member is rotatably supported on the bottom plate of the enclosure, and with this supporting point as the fulcrum, the distance between the fulcrum and an end connecting the second sliding member is made smaller than the distance between the fulcrum and the other end connecting the first sliding member, so that the first and the second sliding members slide in directions reverse to each other through rotation of the linking member. When loading and unloading a cartridge, therefore, it is possible to increase the amount of sliding of the first sliding member relative to the amount of sliding of the second sliding member. As a result, it is possible to increase the amount of sliding of the cartridge. It is therefore possible to downsize the cam member for causing the second sliding member to slide when elastically conducting the loading or unloading operation of the cartridge, thus making it possible to provide a compact magnetic recording/regenerating apparatus which permitting smooth performance of auto-loading or auto-ejection.

In another embodiment of the magnetic recording/regenerating apparatus of the invention, a junction is provided in the second sliding member; a long-hole-shaped engagement section is longitudinally formed at the other end of the linking member; the junction of the second sliding member is movably engaged with the engagement section of the linking member to connect the linking member and the second sliding member; the linking member rotates under the effect of sliding of the second sliding member; and consequently, the junction of the second sliding member moves apart from the fulcrum of the linking member at the engagement section so that the rotation angle of the linking member to a line perpendicular to the sliding direction of the second sliding member crossing the fulcrum becomes larger. By moving the junction until a large rotation angle of the linking member is reached, it is possible to apply a force larger than the pressing force of the junction to the linking member, and cause the first sliding member to slide under a larger force.

As a result, there is provided a magnetic recording/regenerating apparatus with which it is possible to press the pinch roller of the cartridge loaded on the first sliding member against the transfer roller under a larger force, ensure transfer of rotation of the transfer roller, and transfer the magnetic tape at a high accuracy.

In still another embodiment of the magnetic recording/regenerating apparatus of the invention, a junction is provided at an end of the linking member; a long-hole-shaped engagement section is formed in a direction perpendicular to the sliding direction of the first sliding member; the junction of the linking member is engaged with the engagement section of the first sliding member to connect the linking member and the first sliding member; the second sliding member is caused to slide to rotate the linking member so that the junction of the linking member moves in the engagement section of the first sliding member to cause the first sliding member to slide. It is thus possible to transfer rotation of the linking member cartridge to the first sliding member, and cause the cartridge loaded on the first sliding member to smoothly slide.

In further another embodiment of the magnetic recording/regenerating apparatus of the invention, the second sliding member comprises a first member and a second member; a pressing section is provided at a part of the first member; there is provided an elastic member stretched between the first member and the second member; and when pressing the pressing section of the first member against an elastic force of the elastic member while mounting the cartridge, the first sliding member slides by the action of the first member via the linking member so as to discharge the cartridge. Even when the driving source cannot be activated because of a power failure or the like and the cartridge cannot be ejected, therefore, it is possible to manually eject the cartridge 4 in loading by pressing the pressing section of the first member by the use of a pressing member such as a screw driver.

There is thus provided a magnetic recording/regenerating apparatus free from a failure even upon power failure.

What is claimed is:

1. A magnetic recording/regenerating apparatus comprising:

a) an operating member against which an end of a cartridge abuts when said cartridge is inserted into said apparatus;

b) a driving source actuated by the operating member at the initiation of an inserting operation of said cartridge;

c) a two-stage gear connected to the driving source;

d) a cam member meshing with the two-step gear and driven by the driving source;

e) a second sliding member connected to and driven by the cam member, the second sliding member being urged in the direction of insertion of the cartridge into the apparatus by an elastic member, the second sliding member being movable against the urging force of the elastic member in a direction of ejection of the cartridge out of the apparatus;

f) a pivotally supported linking member having a first lever arm and a second lever arm, the second lever arm being connected to the second sliding member;

g) a first sliding member for engaging and moving said cartridge into or out of said apparatus, the first sliding member being connected to the first lever arm of the linking member, the first sliding member being controlled by the linking member so as to move in the direction opposite to the movement of the second sliding member, said first lever arm having a length that is greater than the length of the second lever arm; and h) an eject button acting on the driving source at the initiation of an ejecting operation of said cartridge.

2. A magnetic recording/regenerating apparatus according to claim 1, wherein the first sliding member and the second sliding member move generally towards each other during the inserting operation of the cartridge and move generally away from each other during the ejecting operation.

3. A magnetic recording/regenerating apparatus according to claim 1, wherein the first sliding member moves a distance that is greater than the distance moved by the second sliding member during either of the inserting operation or the ejecting operation.

4. A magnetic recording/regenerating apparatus according to claim 1, wherein a junction is provided on the second sliding member, an elongated engagement hole is formed in the second lever arm of the linking member in a direction parallel to the second lever arm, the junction of the second sliding member being slidably engaged with the engagement hole of the linking member so that the length of the second lever arm is changed as the linking member is rotated, wherein the length of said second lever arm increases with an increase in rotation angle between said second lever arm and a line perpendicular to the movement of said second sliding member.

5. A magnetic recording/regenerating apparatus according to claim 1, wherein a junction is provided on the first lever arm of the linking member, an elongated engagement hole is formed on the first sliding member in a direction perpendicular to the movement of said first sliding member, the junction of the first lever arm being slidably engaged with the engagement hole of the first sliding member.

6. A magnetic recording/regenerating apparatus according to claim 1, wherein said second sliding member comprises a first member, a second member, and a second elastic member connected between said first member and said second member, further wherein a pressing section is provided on said first member, said pressing section being engaged by a pressing force sufficient to overcome a biasing force of the second elastic member so as to enable the first member to move relative to the second member and permit rotation of the linking member to eject the cartridge from the apparatus.

* * * * *

UNITED STATES PATENT AND TRADEMARK OFFICE
CERTIFICATE OF CORRECTION

PATENT NO. : 6,233,112 B1
DATED : May 15, 2001
INVENTOR(S) : Masao Ohkita et al.

It is certified that error appears in the above-identified patent and that said Letters Patent is hereby corrected as shown below:

Claim 1,
Line 9, change "two-step" to -- two-stage --.

Signed and Sealed this

Twenty-sixth Day of February, 2002

Attest:

Attesting Officer

JAMES E. ROGAN
Director of the United States Patent and Trademark Office